United States Patent [19]

Smith et al.

[11] Patent Number: 5,045,100

[45] Date of Patent: Sep. 3, 1991

[54] METHOD OF FORMING A FIBRE OPTIC TERMINAL ASSEMBLY

[75] Inventors: Nigel C. Smith; Christopher M. Bailey, both of Essex, United Kingdom

[73] Assignee: KEYMED (Medical & Industrial Equipment) Ltd., United Kingdom

[21] Appl. No.: 526,146

[22] Filed: May 22, 1990

[30] Foreign Application Priority Data

May 30, 1989 [GB] United Kingdom ............... 8912356

[51] Int. Cl.⁵ .............................................. C03B 37/10
[52] U.S. Cl. ........................................ 65/4.21; 65/4.3; 65/59.4; 65/61
[58] Field of Search .............. 65/2, 3.11, 4.2, 4.21, 65/4.3, 61, 59.4; 350/96.22

[56] References Cited

U.S. PATENT DOCUMENTS

| | | | |
|---|---|---|---|
| 3,204,326 | 9/1965 | Granitsas | 65/4.2 X |
| 3,224,851 | 12/1965 | Hicks | 65/4.21 |
| 3,455,625 | 7/1969 | Brumley et al. | |
| 3,681,164 | 8/1972 | Bazinet, Jr. et al. | 156/294 |
| 3,849,219 | 11/1974 | Hall-Jackson | 156/73.6 |
| 3,933,455 | 1/1976 | Chown | 65/4 |
| 3,966,447 | 6/1976 | Asahara et al. | 65/DIG. 4 |
| 4,116,655 | 9/1978 | Lewis | 65/4.21 |

FOREIGN PATENT DOCUMENTS

| | | | |
|---|---|---|---|
| 1465493 | 2/1977 | United Kingdom | 65/4.2 |
| 1500038 | 2/1978 | United Kingdom | |
| 1595163 | 8/1981 | United Kingdom | |
| 2191873 | 12/1987 | United Kingdom | |

OTHER PUBLICATIONS

Patent Abstracts of Japan, vol. 6, No. 248 (P-160)(1126), Dec., 1982.

Primary Examiner—Robert L. Lindsay
Attorney, Agent, or Firm—Beveridge, DeGrandi & Weilacher

[57] ABSTRACT

A method of forming a fibre optic terminal assembly (17) comprising the steps of inserting fibres (8) into a duct (3) defined by a housing (1) comprising a sleeve portion (21) having an open end (10) and defining a tubular portion of the duct, the fibres being inserted such that the fibres are supported in a closely packed bundle throughout the tubular portion and project through the end of the sleeve portion, trimming the bundle to form an end face (11) thereof, and bonding the fibres to one another and to the housing thereby forming a terminal assembly. The fibres are bonded by applying heat locally to the end face to form a molten glass surface layer, allowing glass from the layer to flow between the fibres of the bundle and allowing the glass to cool such that the glass forms a matrix fusing the fibres to one another and to the housing.

8 Claims, 2 Drawing Sheets

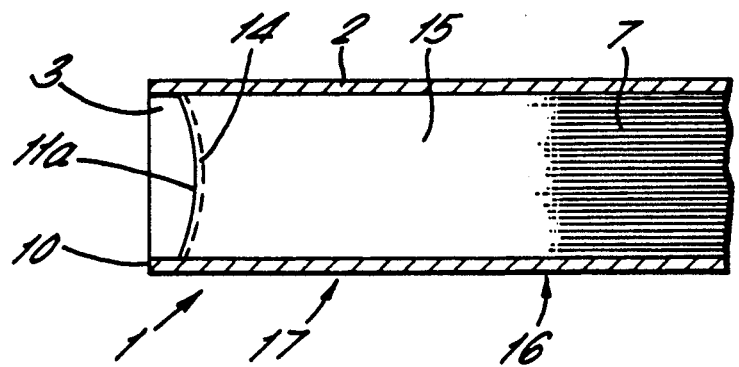
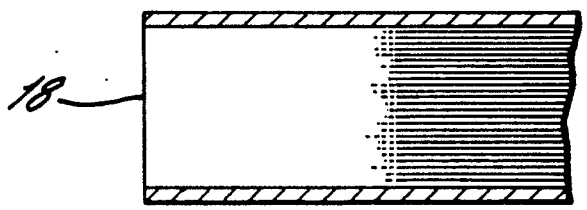
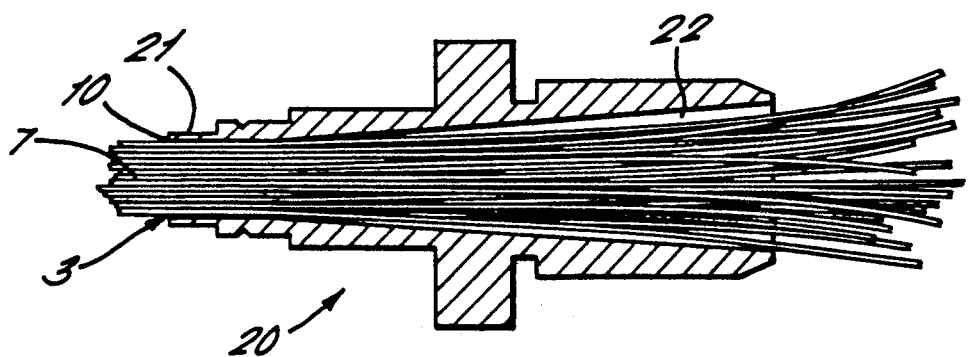

METHOD OF FORMING A FIBRE OPTIC TERMINAL ASSEMBLY

This invention relates to a method of forming a fibre optic terminal assembly in which a fibre optic bundle terminates in a housing.

It is known from U.S. Pat. No. 3,849,219 to provide a fibre optic terminal assembly in which a bundle of optical fibres are inserted in a tubular duct defined by a housing and are held in place by bonding the fibres to one another and to the housing by the injection of an adhesive matrix. A disadvantage of the method is that the adhesive matrix can withstand only moderate temperatures thereby placing a limit on the maximum amount of light transmissible through the assembly. The adhesive matrix also tends to be softer than the glass forming the fibres so that during polishing of the end face of the bundle the fibre ends become rounded leading to surface irregularities and consequent losses in light transmission when connected to an abutting light conductor. The bonding process is also time consuming as the adhesive generally has to be left to cure for several hours.

It is also known to use thermal fusion of fibre optic bundles in a terminal assembly in which a length of the bundle is heated under pressure so as to fuse the fibres together. Careful control of the applied heating and pressure is required in this process to avoid damaging fibres so that consequently the required equipment is expensive and complex to use. A further problem of this method is that of embrittlement of adjacent unfused fibres due to the excessive amount of heat required.

According to the present invention there is provided a method of forming a fibre optic terminal assembly comprising the steps of inserting fibres into a duct defined by a housing comprising a sleeve portion having an open end and defining a tubular portion of the duct, the fibres being inserted such that the fibres are supported in a closely packed bundle throughout the tubular portion and project through the sleeve portion, trimming the bundle to form an end face thereof, and bonding the fibres to one another and to the housing thereby forming a terminal assembly, the fibres being bonded by applying heat locally to the end face to form a molten glass surface layer, allowing glass from the layer to flow between the fibres of the bundle and allowing the glass to cool such that the glass forms a matrix fusing the fibres to one another and to the housing thereby forming a terminal assembly.

An advantage of such a process is that minimal heating is required and embrittlement of adjacent unfused fibres is minimised because the heat is applied at a location remote from the unfused fibres.

Preferably the method includes the further step of removing the glass surface layer after solidification. Conveniently this is achieved by cutting through the housing in a direction transverse to the longitudinal extent of the fibres. The glass surface layer after solidification tends to be dished so that the transverse cutting action restores the end face of the assembly to planar form.

Preferably the method includes the further step of polishing the end face of the assembly exposed by removal of the glass surface layer.

Advantageously the matrix extends less than the full longitudinal extent of the tubular portion.

This ensures that unfused fibres immediately adjacent the fused fibres are located in the duct and are therefore supported by the housing so that any embrittlement of those fibres can be tolerated since the fibres will not be subject to flexure in use.

Particular embodiments of the present invention will now be described by way of example only and with reference to the accompanying drawings of which:

FIG. 4 shows the effect of heat on the fibres within the sleeve;

FIG. 5 shows the sleeve of FIG. 4 after the further step of removing the glass surface layer after solidification; and FIG. 6 is a schematic sectional view of a further housing showing a fibre optic bundle inserted prior to trimming.

Figure 1:
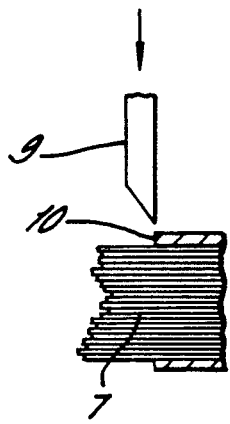
FIG. 1 is a schematic sectional view of a housing in the form of a tubular sleeve being packed with a bundle of optical fibres by means of a jig.

In FIG. 1 a housing 1 comprises a tubular sleeve 2 defining a cylindrical duct 3. The sleeve 2 is located in a bore 4 of a jig 5 having a funnel-shaped channel 6 communicating with the bore and the duct 3.

A bundle 7 of optical fibres 8 is inserted into the sleeve 2 by use of the jig 5 by inserting the bundle through the funnel-shaped channel 6. The jig 5 is then split apart to leave the bundle threaded into the sleeve 2 in tightly packed formation such that in cross-section the sleeve is filled with fibres 8. The fibres 8 are of circular cross-section so that interstices (not shown) extend longitudinally of the fibres in the bundle 7 and between the outer fibres of the bundle and the sleeve 2.

Figure 2:
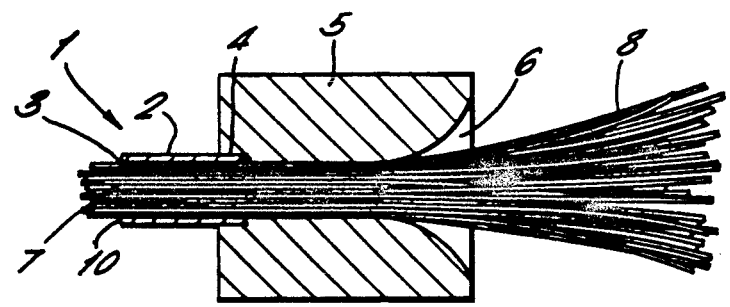
FIG. 2 shows the trimming of the bundle of FIG. 1.
Figure 3:
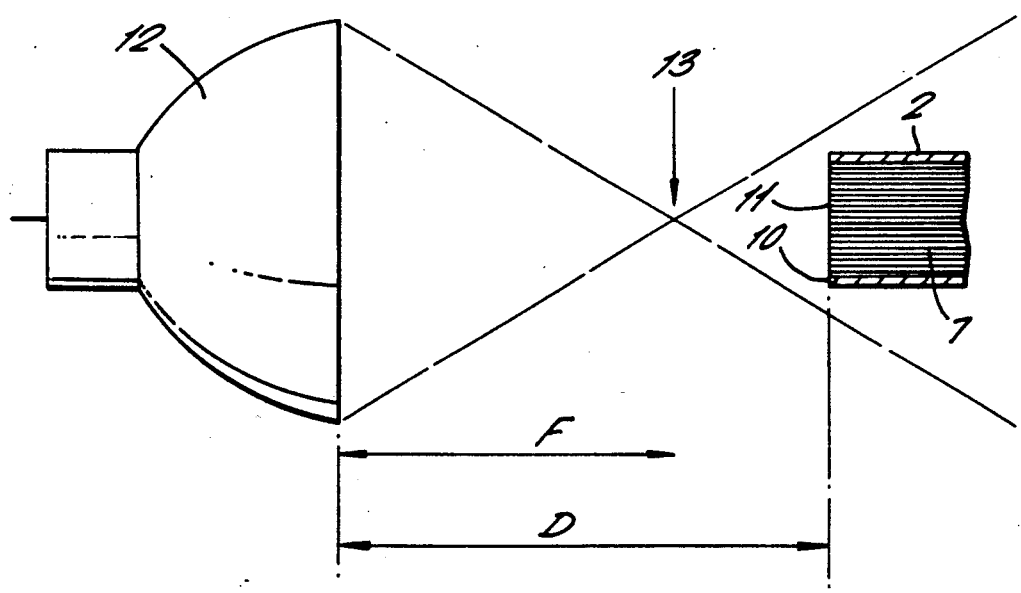
FIG. 3 shows the application of heat using an infrared lamp to the end face of the bundle of FIG. 2.

As shown in FIG. 2 a guillotine 9 is used to trim the bundle 7 at the front end 10 of sleeve 2 such that the trimmed bundle has a planar end face 11 as seen in FIG. 3. An infrared lamp 12 is positioned facing the end face 11. The lamp 12 includes a 150 watt tungsten halogen lamp with an integral parabolic reflector giving a maximum temperature at the focal point of the reflector of approximately 1100° C. The lamp 12 is spaced from the end face 11 by a distance D which is greater than its focal length F and such that the focal point 13 lies in the longitudinal axis of the sleeve 2.

The focal point 13 is also spaced sufficiently from the end face 11 for the entire end face to be illuminated.

The sleeve 2 in FIGS. 1 to 3 is of 4 mm diameter and 8 mm length and is packed with 50 micron diameter fibres to a density of 400 fibres per square millimeter. The focal length F of the lamp is 19 mm and the lamp is spaced 22 mm from the end face 11.

Heat is applied locally to the end face 11 by turning on the lamp for 150 seconds. The lamp is then turned off and the bundle 7 allowed to cool.

The effect of heating is shown in FIG. 4 in which the end face 11a is seen to have receded from the front end 10 of the sleeve 2 and is dished in shape. A glass surface layer 14 is formed at the recessed face 11a and consists of glass which has melted from the heated bundle 7 and has subsequently cooled into a solid layer. Beneath the surface layer 14 is a zone 15 of fused fibres consisting of the bundle of fibres which originally occupied the sleeve 2 at that location but now embedded in a matrix comprising glass from the surface layer 14 drawn into the interstices therebetween by capillary action. This matrix also binds the bundle to the sleeve 2. The capillary flow away from the surface layer 14 erodes the end face 11 which recedes into the sleeve 2 with a progressively dished appearance.

The zone 15 does not extend the full axial length of the duct 3 of the sleeve 2 but terminates at a location 16 beyond which the bundle 7 comprises fibres to which the matrix does not reach and which therefore are not fused together.

FIG. 5 shows the sleeve 2 of FIG. 4 after trimming to remove the surface layer 14 typically by means of a further slice being removed by a diamond impregnated abrasive wheel to sever both the sleeve and the fused zone 15 of the bundle 7.

The fibres within the remaining portion of fused zone 15 retain their individual integrity whilst being intimately embedded in the matrix. Those fibres not in the fused zone 15 but still within the sleeve 2 are supported in close packed array against flexure.

The sleeve 2 and bundle 7 together comprise an assembly 17 which after further trimming as shown in FIG. 5 has an end face 18. The end face 18 is polished to produce an optically flat surface so that the assembly will interface efficiently with the light transmitting surface of any light conductor having a like surface to which the bundle 7 is to be connected.

The extent to which the sleeve 2 is trimmed to expose the end face 18 in the above example is a depth of 2 mm from the front end 10 of the sleeve 2 leaving approximately 3 mm depth of fused fibres in the zone 15.

An alternative housing 20 is shown in FIG. 6 where corresponding reference numerals to those used in the above Figures are used where appropriate for corresponding elements.

The alternative housing 20 includes a sleeve portion 21 defining a cylindrical duct 3 within which a bundle 7 of fibres is supported in close packed relationship.

The housing 20 includes a flared channel 22 communicating with the duct 3 and through which the bundle 7 can be inserted so as to compress the fibres in close packed relationship. The provision of the flared channel 22 obviates the use of a jig 5 during assembly.

As shown in FIG. 6 the bundle 7 initially projects beyond the front end 10 of the sleeve portion 21. The bundle is trimmed as described above with reference to FIG. 2 and the end face 11 formed by such trimming is then heated as described above with reference to FIG. 3.

After heating, the trimming and polishing steps are then carried out as described above with reference to FIGS. 4 and 5.

The above method can be used with many different shapes and sizes of connector provided they include a portion defining a tubular duct of substantially uniform cross-section which may be circular, square or otherwise. The housing may be an endoscope tip or a connector of a light guide coupling. The connector may for example be made of steel, brass or other materials.

Fibres of different dimensions may also be used for example 30 micron diameter fibres may be packed to 1100 fibres per square millimeter, 50 micron diameter fibres may be packed to 400 fibres per square millimeter and 70 micron diameter fibres packed to 200 fibres per square millimeter. Fibres in the range 5 to 250 micron are typical in such applications and can be used in the above method.

The amount of heating required depends on the type of glass constituting the fibres and the length of the zone to be fused. Quartz fibres for example have a higher melting temperature than most glasses. The amount of heating is variable by varying the duration of heating and/or the temperature at the end face 11. The temperature at the end face 11 can be adjusted by varying the lamp power or adjusting the lamp distance D.

We claim:

1. A method of forming a fiber optic terminal assembly comprising the steps of: inserting fibers into a duct defined by a housing, said housing including a sleeve portion having an open end and defining a tubular portion of the duct, the fibers being inserted such that the fibers are supported in a closely packed bundle throughout the tubular portion and project through the end of the sleeve portion; trimming the bundle to form an end face thereof; applying heat locally to the end face to form a molten glass surface layer; allowing glass from the layer to flow between the fibers of the bundle; allowing the glass to cool such that the glass forms a matrix fusing the fibers to one another and to the housing; and controlling the temperature and duration of heating applied to the end face such that the matrix extends less than the full longitudinal extent of the tubular portion.

2. A method as claimed in claim 1 including the further step of removing the glass surface layer after solidification.

3. A method as claimed in claim 1 wherein the surface layer is removed by cutting transversely through the sleeve portion.

4. A method as claimed in claim 1 including the further step of polishing an end face of the assembly exposed by removal of the glass surface layer.

5. A method as claimed in claim 1 wherein heat is applied by means of an infrared lamp.

6. A method as claimed in claim 1, wherein the housing is in the form of a connector.

7. A method as claimed in claim 6, wherein the connector is a light guide coupling.

8. A method as claimed in claim 1, wherein the housing is in the form of an endoscope tip.

* * * * *